United States Patent Office 3,285,757
Patented Nov. 15, 1966

3,285,757
CEMENT COMPOSITION
Kurt W. Cornely, Syosset, N.Y., assignor to American Thermocatalytic Corporation, Mineola, N.Y., a corporation of New York
No Drawing. Continuation of application Ser. No. 83,623, Jan. 19, 1961. This application May 19, 1964, Ser. No. 368,746
4 Claims. (Cl. 106—57)

This application is a continuation of U.S. Serial No. 83,623 filed January 19, 1961, now abandoned.

This invention relates to refractory cements and provides cements suitable for bonding metals, ceramics, and glasses. The cements are also useful for making castings, ramming mixes, and refractory bricks. In addition, the cements can be used as the binder component in cermet-type materials so that the usual sintering is not necessary to effect the bonding. It may also be useful as a binder for thermonuclear elements.

According to the invention, the cement compositions are of at least one zirconium compound and a binder precursor compound. Upon use of the composition the zirconium compound or compounds co-act to form a coherent mass, which, if the cement is used as an adhesive, adheres to the surfaces joined thereby.

The zirconium compound can be zirconia or zircon and preferably, both zirconia and zircon are used. The zirconia is advantageously stabilized zirconia. Stabilized zirconia can be obtained by fusing zirconia with another material, e.g., calcium oxide or magnesium oxide in an amount of about 3.5–5.5 wt. percent, and is characterized in that some of the normal zirconia crystal structure changes due to change in temperature do not occur. Thus, the material is dimensionally stabilized. Instead of using a fused material, an admixture of zirconia and the other material can be used. Stabilized zirconia is known.

Zirconia is zirconium oxide and zircon is zirconium silicate.

In one class of the compounds of the invention, the composition comprises stabilized zirconia, zircon, and, as the binder precursor, a silicate, e.g., water soluble silicate. These cements are useful in making bonds or products such as castings which must withstand temperatures in excess of about 4000° F.

In the cement composition, the zirconia and zircon are present in fine size particle form, and, preferably, one of these components is relatively coarse and the other is relatively fine. Desirably, the zirconia is relatively coarse. The zirconia or stabilized zirconia can be 40 mesh to —325 mesh, and the zircon can be —200 to less than —325 mesh powder. A stabilized zirconia powder, —80 mesh in admixture with a —325 mesh zircon powder is particularly well suited to the purposes of the invention.

The preferred water soluble silicate is sodium silicate, wherein $Na_2O:SiO_2$ is 1:3.22–1:3.85, e.g., 1:3.75 which is preferred.

The composition can be in wet or dry form. In wet form it is an admixture of powders of the zirconium compounds and an aqueous solution of the water soluble silicate. In dry form it is an admixture of the ingredients, including sodium silicate which is readily soluble, in powdered form, and, of course, is wetted with water before being used.

As to amounts of materials, one of the zirconium compounds can be 25 wt. percent of the other zirconium compound, and the water soluble silicate, as sodium silicate, can be 8 wt. percent but preferably at least 25 wt. percent of the combined weights of the zirconium compounds.

The cement composition is used in the wetted form, and whereas the aforementioned proportions of zirconium compounds and sodium silicate are not critical, the proportion of water in the wet composition is important and should be such that the aqueous medium (which is an aqueous solution of sodium silicate) contains about 26–32 wt. percent, preferably 30%, sodium silicate.

In the preferred composition, there are 0.5 part zirconia, 0.5 part zircon and about ⅓ part sodium silicate aqueous solution in which the sodium silicate is about 26 to 32 wt. percent, or better about 30 wt. percent, of the solution.

The class of cements exemplified by those in which the binder precursor is a water soluble silicate are air drying and are particularly good for joining metals. For application following thorough mixing, a thin coating can be applied to each surface, the pieces can then be brought together and the cement allowed to dry. Slow drying is desirable as it avoids bubbling of the cement. Due to porosity of the materials, drying time will vary. It can be determined experimentally. Generally, the joint will dry upon overnight standing at room temperature (70 to 90° F.), or at 160° to 170° F. for one hour. Either method will yield a joint ready for service at elevated temperatures. The reactions occurring during formation of the joint or bond may be complete upon the conclusion of either of the mentioned procedures, or may be completed when the bond is for the first time heated to elevated temperature. If immediate application of a mechanical load is foreseen, a preferred procedure is to subject the bond to either of the two above-mentioned procedures and to then heat it to 1100° F. in 20 minutes.

In another class of the compounds of the invention, the composition comprises stabilized zirconia, zircon, and, as the binder precursor, a phosphorus compound. These compositions are useful as are the other compositions of the invention, and can be used for services wherein temperatures in excess of about 5000° F. are encountered so that it is particularly well suited for use in bonding ceramics.

The formulation of the phosphorus cement can be the same in respect to particle sizes, relative particle sizes, and amounts of the zirconium compounds, as is set forth above for the compositions wherein the binder precursor is sodium silicate. The preferred amounts and particular sizes for the cement compositions for the two types of binder precursors are the same.

The phosphorus compound can be a phosphate in the form of phosphoric acid or phosphoric acid anhydride and can be present in an amount equivalent to about 13–13.6 wt. percent $P_2O_5$ of the combined weights of the zirconium compounds. The preferred amount is 13.3 wt. percent.

Also, the phosphorus compound-containing composition can be wet or dry. When a wet composition, the binder precursor can be aqueous phosphoric acid (orthophosphoric acid) having a $P_2O_5$ concentration of 0.53 gram/c.c. In a dry composition, the phosphorus compound can be a decomposable phosphate, e.g., monoaluminum phosphate.

The preferred composition containing a phosphorus compound as the binder precursor is wet, and the wetting liquid can be any liquid which will serve as a suspending medium for the zirconium compound, and which will be expelled from the composition during curing of bonds made therewith. Preferably, the wetting liquid is water.

A composition found to be well suited for the purposes of the invention comprises about 0.5 part zirconia and about 0.5 part zircon and about 0.15 part $P_2O_5$, the $P_2O_5$ being present as aqueous phosphoric acid. The amount of water can be varied over a wide range and need only be an amount suitable to provide the desired consistency.

The cement compositions exemplified by the cements containing a phosphorus compound as a binder precursor have excellent bond strength in refractories, low thermal expansion and exceptional resistance to heat shock. It is therefore well suited as a sealer, mortar, casting compound, surface coating for refractories, slip-type cements and very dense ramming and pottery compounds. For application, following mixing, apply to both surfaces and join and then either (a) raise temperature gradually from room temperature to 2200° F. over a period of at least about 60 minutes, or (b) dry at 160° F.–170° F. for 20–30 minutes, and then dry by heating from 170 to 1100° F. in 10–20 minutes, and finally cure at 2200° F for 20 minutes.

Instead of using phosphoric acid, there can be used the reaction product of zirconium tetrachloride or zirconium oxychloride and phosphoric acid. Upon contacting these reactants in an aqueous medium, a precipitate forms and this precipitate, following drying, or firing at about 2340° F. whereupon an 8% weight loss occurs, can be used as the phosphorus compound which is admixed with the zirconium compounds.

*Example 1—Silicate as binder precursor*

The formulation is as follows:

| | Parts by wt. |
|---|---|
| Stabilized zirconia powder —80 mesh, 3.5–5.5% CaO | 0.50 |
| Milled zircon, —325 mesh | 0.50 |
| Sodium silicate aqueous solution, $Na_2O:SiO_2$ of 1:3.75, at pH 10.0–10.5, Bé. of 35.0, viscosity of 220 cps. at 30° C. | 0.33 |

Properties of this cement composition following application are as follows:

Thermal:
  Maximum service temperature, °F. _____ 4,300
  Coeff. of thermal expansion, in. per °F. __ $5 \times 10^{-9}$
  Thermal neutron cross sect., barns _____ 20–30
  Thermal conductivity, B.t.u./hr. (ft.$^2$) (°F./in.) _____ 23.2
  Thermal shock resistance _____ Excellent Mechanical:
  Hardness _____mohs__ 8–9
  Tensile strength _____p.s.i__ 10,000–15,000
  Compressive strength _____p.s.i__ 80,000–150,000
  Modulus of rupture _____p.s.i__ 23,000
  Porosity (refractories, Norton), percent _____ 0.02

Electrical:
  Dielectric strength _____ 200–200 volts/mil.
  Volume resistivity _____ $10^{13}$–$10^{15}$ ohms/cm.
  Arc resistance _____ Over 500 sec.
  Dielectric constant _____ 60 cps. approx. 9.0;
    $10^6$ cps. 7.0–9.0.

Chemical:
  Acid resistance:
    Soluble in HF
    Slowly soluble in concentrated $H_2SO_4$ (boiling)
    Insoluble in HCl, $HNO_3$, $H_3PO_4$ ($H_2SO_4$ at room temp.)
  Alkali resistance:
    Resistant to boiling KOH (60%)
  Other resistance:
    Resistant to CO, $CO_2$, $H_2$ at temperatures over 1,800° F.
    Resistant to oxygen and hydrocarbons
    Reacts with carbon at temperatures over 3,000° F. probably to form carbides

*Example 2—Phosphorus as binder precursor*

| | Parts by wt. |
|---|---|
| Stabilized zirconia powder, —80 mesh, 3.5–5.5% CaO | 0.50 |
| Milled zircon, —325 mesh | 0.50 |
| Phosphoric acid, $P_2O_5$ equal to 0.53 gram/cc. | 0.15 |

Properties of this cement are substantially the same as those given for the cement of Example 1 with the following exceptions:

Maximum service temperature, °F._____ 5,300
Porosity, percent _____ over 0.2
Alkali resistance _____
    Partially resistant to boiling KOH (60%).

In the foregoing examples the analysis for the zirconia and zircon is as follows:

| Stabilized zirconia: | Wt., percent |
|---|---|
| $ZrO_2$ | 95.32–93.32 |
| $SiO_2$ | 0.55 |
| $TiO_2$ | 0.66 |
| $Fe_2O_3$ | 0.02 |
| $Al_2O_3$ | 0.02 |
| CaO | 3.52–5.52 |

| Milled zircon: | Wt., percent |
|---|---|
| $ZrO_2$ | 65.94 |
| $SiO_2$ | 32.65 |
| $TiO_2$ | 0.29 |
| $Al_2O_3$ | 0.81 |
| $P_2O_5$ | 0.11 |
| Alkaline oxides | 0.20 |

Unless otherwise indicated, temperatures herein are °F.; "parts" are parts by weight; and percent is wt. percent.

While it is not desired to predicate patentability on any particular theory, the mechanism whereby bond strength is attained, where the binder precursor is a water soluble silicate, is believed to involve loss of water by evaporation followed by loss of water of crystallization, and then a final chemical action, at the high temperature, between highly viscous silicate and the zirconia and zircon. In the case of the compositions of the type where the binder precursor is a phosphorus compound, the mechanism probably involves the initial loss of some water so that the phosphoric acid concentration is increased, followed by loss of any water of crystallizations, and finally a chemical reaction of polymeric phosphates and phosphoric acids with the zirconium compounds which occur upon the initial heating to high temperature.

What is claimed is:
1. A refractory cement adapted to be mixed with water for use for services involving temperatures in excess of about 4000° F. consisting essentially of particles of a zirconium-containing composition selected from the group consisting of zirconia, zircon and mixtures of the foregoing, and a water-soluble binder precursor selected from the group consisting of (1) a water-soluble sodium silicate in an amount of at least 8% by weight of the zir- conium-containing composition and having an $Na_2O:SiO_2$ ratio in the range of 1:3.22–1:3.85, and (2) a water-soluble phosphate compound in an amount equivalent to 13 to 13.6 wt. percent $P_2O_5$ of the zirconium-containing composition.

2. A refractory cement according to claim 1 wherein the sodium silicate is in the form of an aqueous solution containing 26 to 32 wt. percent sodium silicate.

3. A refractory cement according to claim 1 wherein the zirconium-containing composition is a mixture of zirconia and zircon in a weight ratio of 1:4 to 4:1.

4. A refractory cement according to claim 3 wherein one of the zirconium compounds is more finely divided than the other.

References Cited by the Examiner
UNITED STATES PATENTS

| | | | |
|---|---|---|---|
| 1,809,249 | 6/1931 | Morgan | 106—57 |
| 2,771,376 | 11/1956 | Cappellman | 106—57 |
| 2,880,097 | 3/1959 | Emhiser | 106—84 |
| 3,138,471 | 6/1964 | Wygant | 106—84 |

TOBIAS E. LEVOW, *Primary Examiner.*

J. POER, *Assistant Examiner.*

UNITED STATES PATENT OFFICE
CERTIFICATE OF CORRECTION

Patent No. 3,285,757            November 15, 1966

Kurt W. Cornely

It is hereby certified that error appears in the above numbered patent requiring correction and that the said Letters Patent should read as corrected below.

Column 3, line 70, for "200-200" read -- 200-300 --.

Signed and sealed this 19th day of September 1967.

T W. SWIDER            EDWARD J. BRENNER
                                 Commissioner of Patents

UNITED STATES PATENT OFFICE
CERTIFICATE OF CORRECTION

Patent No. 3,285,757 November 15, 1966

Kurt W. Cornely

It is hereby certified that error appears in the above numbered patent requiring correction and that the said Letters Patent should read as corrected below.

Column 3, line 70, for "200-200" read -- 200-300 --.

Signed and sealed this 19th day of September 1967.

(SEAL)
Attest:

ERNEST W. SWIDER
Attesting Officer

EDWARD J. BRENNER
Commissioner of Patents